US011830376B2

(12) United States Patent
Welch et al.

(10) Patent No.: US 11,830,376 B2
(45) Date of Patent: Nov. 28, 2023

(54) PROVIDING WEATHER INFORMATION USING SOUND LOCALIZATION (71) Applicant: INTERNATIONAL BUSINESS MACHINES CORPORATION, Armonk, NY (US)

(72) Inventors: Jessika Ann Welch, Amesbury, MA (US); Maureen Kraft, Hudson, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/818,777

(22) Filed: Aug. 10, 2022

(65) Prior Publication Data
US 2022/0383774 A1    Dec. 1, 2022

Related U.S. Application Data (63) Continuation of application No. 17/086,557, filed on Nov. 2, 2020, now Pat. No. 11,501,660.

(51) Int. Cl.
| G09B 21/00 | (2006.01) |
| G06Q 30/0204 | (2023.01) |
| G06F 3/16 | (2006.01) |
| G01W 1/06 | (2006.01) |
| G06Q 50/16 | (2012.01) |
| G06Q 50/26 | (2012.01) |

(52) U.S. Cl.
CPC ............ *G09B 21/006* (2013.01); *G01W 1/06* (2013.01); *G06F 3/16* (2013.01); *G06Q 30/0205* (2013.01); *G09B 21/007* (2013.01); *G06Q 50/163* (2013.01); *G06Q 50/265* (2013.01)

(58) Field of Classification Search
CPC .............. G09B 21/007; G09B 21/006; G06Q 30/0205; G06F 3/16
USPC ........................................................ 434/116
See application file for complete search history.

(56) References Cited

FOREIGN PATENT DOCUMENTS

| CN | 104932793 A | 9/2015 |
| CN | 105141999 B | 4/2018 |
| KR | 102018655 B1 | 9/2019 |

OTHER PUBLICATIONS

Carroll et al., "Designing Accessible Visualizations: The Case of Designing a Weather Map for Blind Users," In: Stephanidis C., Antona M. (eds) Universal Access in Human-Computer Interaction. Design Methods, Tools, and Interaction Techniques for einclusion. UAHCI Jul. 2013. Lecture Notes in Computer Science, vol. 8009. Springer, Berlin, Heidelberg, https://doi.org/10.1007/978-3-642-39188-0_47, pp. 436-445.

(Continued)

*Primary Examiner* — Kesha Frisby
(74) *Attorney, Agent, or Firm* — Caleb D. Wilkes (57) ABSTRACT A method, computer system, and computer program product for providing weather information are provided. An indication of a subject of interest may be received from a user. A geo-location of the subject of interest may be determined. Weather information within a threshold distance from the geo-location may be determined. Sounds corresponding to the weather information may be generated. The sounds may include sound localization with respect to the user in order to indicate a position of the weather information with respect to the geo-location.

20 Claims, 6 Drawing Sheets (56) References Cited

OTHER PUBLICATIONS

Feldman, "The Best Use of Augmented Reality Right Now is the Weather Channel's," Intelligencer, Post Reality, Jan. 21, 2019, https://nymag.com/intelligencer/2019/01/the-weather-channels-augmented-reality-segments.html, [Retrieved from the Internet Jul. 17, 2020], 6 pages.

Hanuska et al., "Method and System for Adding Sound to Weather Notifications," IP.com Prior Art Database Technical Disclosure, No. IPCOM000237221D, Jun. 9, 2014, 2 pages.

Inglobe Technologies, "Shangoo: Augmented Weather Forecasts (Augmented Reality App)," YouTube.com, Dec. 16, 2013, https://www.youtube.com/watch?v=io0-S9pU6vM, [retrieved from the Internet Jul. 10, 2020], 2 pages.

IOT for All, "Sound Classification with TensorFlow," DataArt, Jun. 24, 2020, [retrieved from the internet Jul. 17, 2020], https://www.iotforall.com/tensorflow-sound-classification-machine-learning-applications/, 9 pages.

Levine, "Hearing Loss and Tinnitus", Chapter 9, Office Practice of Neurology (Second Edition), Samuels et al. (Eds.), Elsevier Science (USA), 2003, pp. 87-102.

Mell et al., "The NIST Definition of Cloud Computing," Recommendations of the National Institute of Standards and Technology, U.S. Department of Commerce, Special Publication 800-145, Sep. 2011, 7 pages.

Middlebrooks et al.,"Sound Localization", collection from ScienceDirect of ten abstracts for articles/chapters that are found in ScienceDirect database, these abstracts were the search results of searching with phrase "Sound Localization", [retrieved from the Internet Jul. 2020], https://www.sciencedirect.com/topics/medicine-and-dentistry/sound-localization, 12 pages.

Parente et al., "BATS: The Blind Audio Tactile Mapping System," Department of Computer Science, University of North Carolina at Chapel Hill, Published Mar. 2003, http://www.cs.unc.edu/Research/assist/bats/papers/BATS.pdf, 9 pages.

Pending U.S. Appl. No. 17/086,557, filed Nov. 2, 2020, entitled, "Spatial Weather Map for the Visually Impaired,", 38 pgs.

Plaisant, "iSonic: Interactive Data Sonification for Blind Users," YouTube.com, https://www.youtube.com/watch?v=8hUIAnXtlc4, published on YouTube.com Sep. 2013, [document retrieved from the Internet Jul. 10, 2020], 2 pages.

Schuett et al., "Auditory Weather Reports: Demonstrating Listener Comprehension of Five Concurrent Variables," AM '14, Oct. 1-3, 2014, Aalborg, Denmark, ACM 978-1-4503-3032-9/14/10, https://doi.org/10.1145/2636879.2636898, 7 pages.

PROVIDING WEATHER INFORMATION USING SOUND LOCALIZATION

BACKGROUND

Embodiments of the present invention relate, generally, to the field of computing, and more particularly to providing weather information using sound localization.

There have been significant advances in developing websites that are accessible to individuals with disabilities. Maps represent a very common visualization approach on web pages. A challenging aspect of accessible web design is developing equivalents of data visualizations for the visually impaired. Weather maps are typical examples of such visualizations. Blind and visually impaired persons may interact with weather maps in multiple ways. One way is to use a screen reader to hear textual information on a user screen or to use sonified maps, which uses the non-textual audio output to allow users to comprehend detailed as well as trend data rendered within maps.

SUMMARY

According to an exemplary embodiment, a method for providing weather information is provided. A method, computer system, and computer program product for providing weather information are provided. An indication of a subject of interest may be received from a user. A geo-location of the subject of interest may be determined. Weather information within a threshold distance from the geo-location may be determined. Sounds corresponding to the weather information may be generated. The sounds may include sound localization with respect to the user in order to indicate a position of the weather information with respect to the geo-location.

A computer system and a computer program product corresponding to the method described above are also provided according to some exemplary embodiments.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the sonification of weather map data or communication of data attribute variation plotted within a visualization by using sound. The following described exemplary embodiments provide a system, method, and program product to provide spatial weather map data to the visually impaired through cadence, severity, location, distance, and time. Therefore, the present embodiments have the capacity to improve the technical field of weather map systems by providing additional means of communication of weather that supports blind and visually impaired persons as well as persons in a situation where visual aids are not available.

As previously described, there have been significant advances in developing websites that are accessible to individuals with disabilities. Maps represent a very common visualization approach on web pages. A challenging aspect of accessible web design is developing equivalents of data visualizations for the visually impaired. Weather maps are typical examples of such visualizations. Blind and visually impaired persons may interact with weather maps in multiple ways. One way is to use a screen reader to hear textual information on a user screen or to use sonified maps, which uses the non-textual audio output to allow users to comprehend detailed as well as trend data rendered within maps.

Although given weather maps contain visualizations, it may have challenges as it requires the author to code the maps with textual information that may be exposed to the screen reader through the use of Accessible Rich Internet Applications (ARIA) tags. More importantly, a blind or visually impaired user is challenged to find the critical data in a map such as location and the intensity of the weather that may pose a threat to safety. Walking through the map linearly may fail to alert the user of the information in a timely fashion, miss finding information relating to severe weather conditions, and/or said information may be miscommunicated or fail to communicate urgency. Certain solutions may include sonification and tactile interaction to provide additional information to a solution. However, these solutions can be very static and may lack important information that is available to a sighted user such as location, distance, severity, time, and cadence of weather that is approaching or surrounding the user. In other words, today, visually impaired users do not get a holistic view that visual users do. As such, it may be advantageous to, among other things, implement a system capable of combining sound localization with weather map data including weather severity, location, cadence, distance, and time to provide the visually impaired individuals with the experiential equivalent of "at a glance view" of the user's surrounding weather through auralization.

According to one embodiment, the present invention may deliver spatial and experiential weather data through the use of sound localization, cadence, severity, location, distance, and time. The present invention may also combine sound localization with weather map data including weather severity, location, cadence, distance and time. The present embodiments may further integrate historical weather map models with sound classification to improve the quality of information delivered to the visually impaired over time.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for generating spatial weather map data through the use of sound localization, cadence, severity, location, distance, and time.

Figure 1:
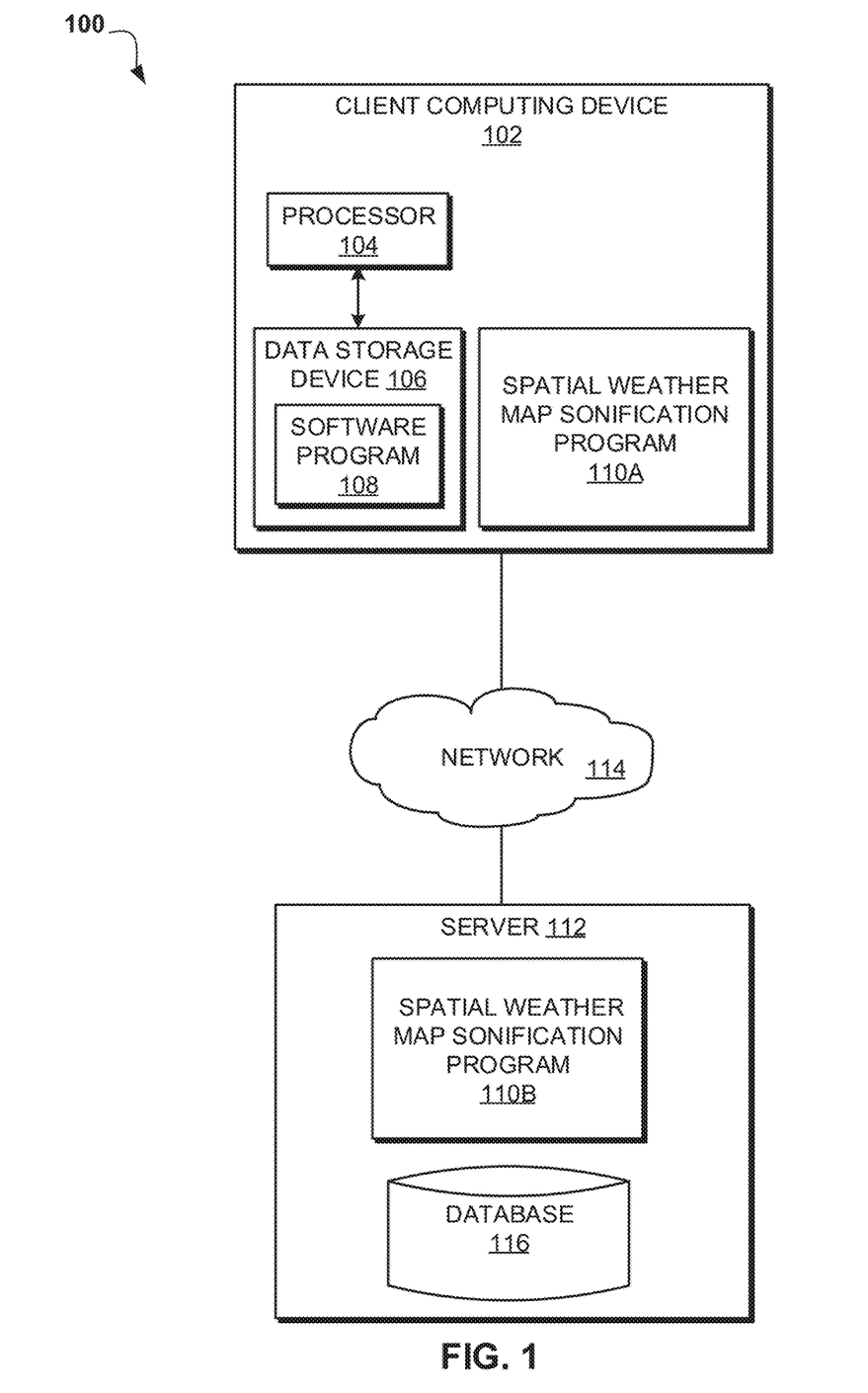
FIG. 1 illustrates an exemplary networked computer environment according to at least one embodiment.

Referring to FIG. 1, an exemplary networked computer environment 100 is depicted according to at least one embodiment. The networked computer environment 100 may include a client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network, and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a spatial weather map sonification program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a spatial weather map sonification program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiments, the spatial weather map sonification program 110A, 110B may be a program capable of receiving weather map information, transmitting the weather map information to a user via the use of sound localization, overlaying the weather map with the user's geo-location, and providing various auditory cues to identify specific information related to the weather condition. The spatial weather map sonification process is explained in further detail below with respect to FIG. 2.

Figure 2:
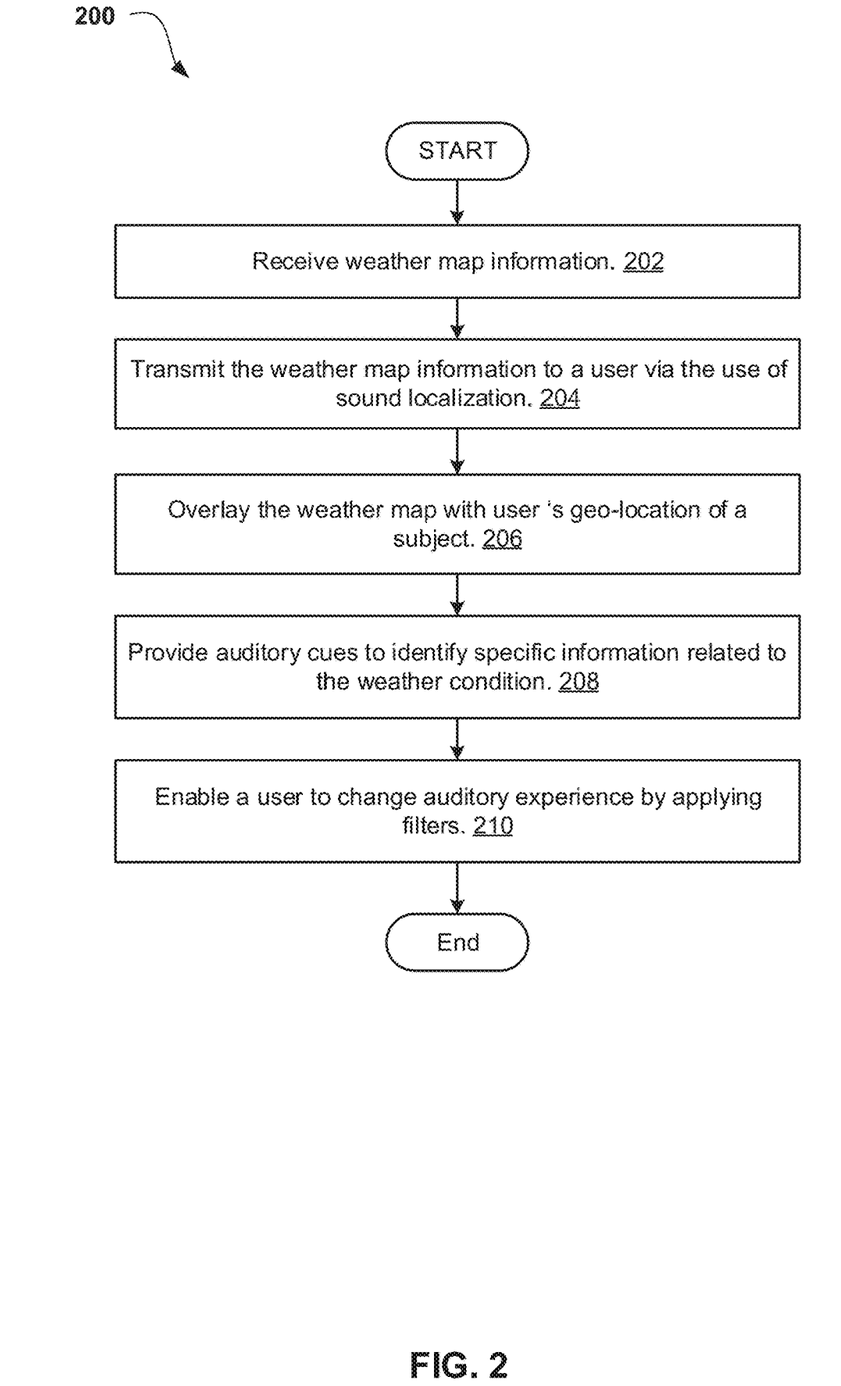
FIG. 2 is an operational flowchart illustrating a spatial weather map sonification process according to at least one embodiment.

Referring to FIG. 2, an operational flowchart for a spatial weather map sonification process 200 is depicted according to at least one embodiment. At 202, the spatial weather map sonification program 110A, 110B receives weather map information. According to one embodiment, spatial weather map sonification program 110A, 110B may monitor the use of a weather map on a user device and the user interaction with the weather map when the visually impaired user interacts with the weather map through the use of sound localization headphones or other types of auditory input that uses sound. The spatial weather map sonification program 110A, 110B may then receive information related to location, severity, cadence, distance, type of weather, and time from the weather map the user was interacting with.

At 204, the spatial weather map sonification program 110A, 110B transmits the weather map information to a user via the use of sound localization. According to one embodiment, the spatial weather map sonification program 110A, 110B may analyze the weather map information and deliver the location of the approaching or surrounding weather to a user via the use of sound. For example, the spatial weather map sonification program 110A, 110B may use the title of an alert message contained in the weather map and enable a screen reader to announce the content or the title of the alert message, such as "lightning nearby last 5 minutes". If no title is specified, then a title may be auto-generated by announcing active map layers or geo-location of a user and time. Such auto-generation may be a verbal description of the content shown within the visualization using legend and data layers plotted.

At 206, the spatial weather map sonification program 110A, 110B overlays the weather map with the user's geo-location of a subject. A subject may be any location within the context of visualization, such as a user, asset, point of interest, geo-coordinates (latitude, longitude), etc. According to one embodiment, the spatial weather map sonification program 110A, 110B may position a user at the map's center point or point of interest. In one embodiment, a point of interest may be a location of business or property at threat of inclement weather. In yet another embodiment, the spatial weather map sonification program 110A, 110B may ingest location information of a visually impaired user and determine points of interest within a pre-configured threshold radius from the user location and announce the weather-related information to the user. The spatial weather map sonification program 110A, 110B may find one or more weather data points within the preconfigured radius from the center point and audio information plays from a point of interest and emanates outward in every direction. The location may be fixed and before playback of sounds, a user may need to first understand a subject location (self, point of interest, etc.) such that the user may understand the distance, changes in conditions, and risk. In at least one other embodiment, the spatial weather map sonification program 110A, 110B may provide auditory cues in combination to represent the visual overlay of weather data on the map. For example, the spatial weather map sonification program 110A, 110B may translate visual language into aural language or visual attributes of data into audible attributes of data. Visual attributes may comprise color, brightness, intensity, opacity, size, dimensions to map to audible attributes of data such as pitch, tone, tempo, volume. Some embodiments may include accepting input for placing the user in the center of the map or other location on the map to enable the user to receive spatial cues identifying where the weather is in relation to the user input location. The user input location may include north, south, east, or west of a user current location in case of a 2D map. The user input location may include above or below the user location in a case of a 3D map. The user input location may include a minimum, a maximum or threshold information in a case of a time series chart.

In every instance or embodiment, a user may have keyboard access to a legend that identifies and defines all audible attributes representing the data plotted on the map, also known herewith as auditory cues, such that a user may be able to look up and understand the meaning of any auditory cue.

At 208, the spatial weather map sonification program 110A, 110B provides auditory cues to identify specific information related to the weather condition. According to one embodiment, the spatial weather map sonification program 110A, 110B may provide auditory cues to identify the intensity of the weather. For example, the spatial weather map sonification program 110A, 110B may generate a pitch and tone of approaching or surrounding lightning strikes. In the case of a user's current time and location, this embodiment could aid in identifying proximity and severity of risk in instances where thunder may or may be not present. The spatial weather map sonification program 110A, 110B may provide auditory cues to identify the cadence of the weather, for example, a modulation or inflection of weather gusts. In yet another embodiment, the spatial weather map sonification program 110A, 110B may provide auditory cues using volume and frequency of sound to describe the distance of data. The generated sounds may vary in volume and frequency of sound to describe distance of data and directional location. In one embodiment, the spatial weather map sonification program 110A, 110B may take into account the type of weather, such as rain, wind, lightning, snow, freezing rain, etc. and leverage sound classification to appropriately share auditory cues with a user. For example, a blind user is planning their walking route to work and the user may receive an alert that there are lightning strikes in the area. However, this information is not helpful for visually impaired users. They may interact with the weather map system using sound localization and discover through location and intensity of sound that the lightning strikes are 10 miles west of them and should reach their location within 30 minutes. The walk to work is east and takes about 10 minutes. The user may now safely decide to walk to work before any risk of the lightning strike.

In at least one other embodiment, each sound may have pitch, tone, loudness, and tempo and different pitch and tone or timber may indicate different types of weather. For instance, the spatial weather map sonification program 110A, 110B plays note "A" staccato piano for the lightning strike and plays note "D" in Oboe sound to represent wind gusts. Loudness and spatial output may indicate proximity, severity, and direction. The tempo may be utilized to represent the amount of activity. For example, the spatial weather map sonification program 110A, 110B may express single lightning strikes as staccato and sustained winds as the whole note played for a long duration. In one embodiment, a single phrase of notes or the playback "auralization" may be like a through-composed song (i.e. no repetition of sounds, no refrain or chorus). Once the above auralization is played, the spatial weather map sonification program 110A, 110B may enable a user to enter each sound into focus for more details using the keyboard controls and/or voice recognition technique and allow the user to learn more details about the weather conditions. For example, just as a visual user may hover or zoom (e.g. visual controls on a map) to receive more detail about a particular subset of data plotted, an aural user may use keyboard controls to scroll through and select areas of sound within the playback to receive more details about what these sounds represent.

At 210, the spatial weather map sonification program 110A, 110B enables a user to change the auditory experience by applying filters. According to one embodiment, the spatial weather map sonification program 110A, 110B may allow a user to interact with the map requesting weather in motion, either requesting historical data or future forecast. Such a filtering capability is to deliver similar user experiences to visually impaired users such that even visually impaired users may receive key takeaways from the data. For example, the visually impaired users may filter on map layers using a keyboard or voice recognition techniques to show or hide weather parameters. The weather in motion may be data aurally played relative to the position of a subject location (e.g. a user location) as the user stays at a fixed location and the notes play linearly, it passes over or arrives at the user location. In one embodiment, the spatial weather map sonification program 110A, 110B may filter by time—past, present, and future and animate "past to present" or "present to future". The spatial weather map sonification program 110A, 110B may provide a user with spatial and experiential data of the weather that was or is to be. In another embodiment, the spatial weather map sonification program 110A, 110B may leverage historical weather models and sound classification to improve the experience of the auditory cues over time based on actual sound, severity, and behavior of the given weather model. In one embodiment, the spatial weather map sonification program 110A, 110B may obtain feedback from the visually impaired with respect to the effectiveness of the sound information or amount of information presented to the user when the user was surrounded by severe weather. The spatial weather map sonification program 110A, 110B may also monitor the visually impaired user's behavior after the user received sound information from the system as to the approaching inclement weather.

In yet another embodiment, the spatial weather map sonification program 110A, 110B may allow a user to change the experience by editing filters. For example, the spatial weather map sonification program 110A, 110B may allow a user to customize pitch, tone, loudness, and tempo for each type of weather and store the information in a database. For example, the spatial weather map sonification program 110A, 110B may allow a visually impaired user to substitute a different sound (e.g. instrument, note, tone, volume, etc.) just like a visual user may change color palette, theme, contrast, lightness, darkness, etc. Another filter edit may change locations of interest by panning or dragging function such that the visually impaired user may change the user's current location to another location and hear playback from a different perspective to understand data plotted relative to that new point.

Figure 3:
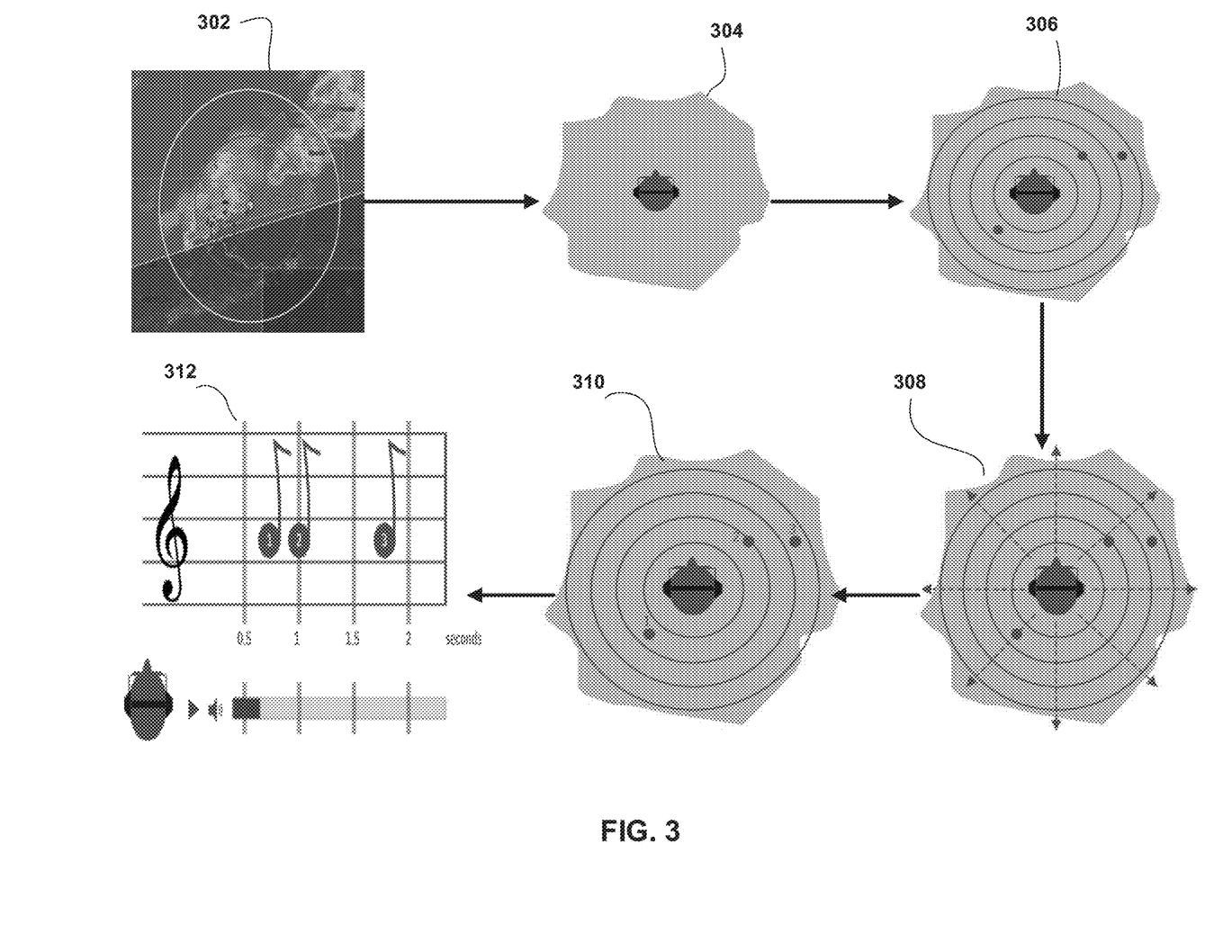
FIG. 3 is a block diagram illustrating an exemplary spatial weather map sonification process according to at least one embodiment.

Referring to FIG. 3, a block diagram illustrating an exemplary spatial weather map sonification process is depicted according to at least one embodiment. At 302, a visually impaired user may encounter a weather map on a screen. The spatial weather map sonification program 110A, 110B may play a map title to the user. For example, the spatial weather map sonification program 110A, 110B may play "Lightning (sound) nearby your current location in the last five minutes." If no title can be specified, then a title may be auto-generated by the spatial weather map sonification program 110A, 110B announcing active map layer(s), geo-location, and time. At 304, the visually impaired user may choose to enter the map through keyboard controls and bring the map into focus. The visually impaired user may be "positioned" at the map's center point or "point of interest." The point of interest may be the user's geo-location or location of businesses, property, or assets. At 306, for demonstration purposes, range rings may show the distance from the point of interest to the plotted weather data. Upon entry, the visually impaired user may hear the gist of the weather map data or spatial sound sequence playback. At 308, the spatial weather map sonification program 110A, 110B may play audio playback starting from the point of interest and emanating outward in every direction and playing the sounds as it encounters the weather. At 310, the playback of the gist may take 2-4 seconds. Each sound may have pitch, tone, loudness, and tempo. For example, pitch and tone or timbre may indicate a weather type. A lightning strike may be represented by playing the note "A" staccato using piano sound, wind gusts may be played with the note "D" using oboe sound. Loudness and spatial output may indicate proximity, severity, or direction of the weather. The tempo may represent the amount of weather activity. For example, layer 1-lightning/single lightning strike may be played by staccato, or layer-e winds/sustained winds may be played using a whole note for a long duration. At 312, the spatial weather map sonification program 110A, 110B may allow the user to further control the exploration of the map content including pause, replay, advance, speed, etc. During the gist playback, the user may drill down to receive details about every forecasted event represented by a sound. Through keyboard controls, the user may enter into focus on the gist playback, then may navigate (via tab or arrow key) through each of the sounds, find the sound of interest, press enter/down arrow key to enter that sound into focus, and hear any details specific to that weather event. Details of the event may include when the event took place, where the event is taking place, how big the event is and other information available via tooltip or legend. For example, the spatial weather map sonification program 110A, 110B may play the details of the event as "Cloud-to-ground lightning strike 2 miles southwest of the current location. This is the most recent strike, 20 minutes ago. 10 minutes until all clear".

As previously described, in every instance or embodiment, a user may have keyboard access to a legend that identifies and defines all audible attributes representing the data plotted on the map, also known herewith as auditory cues, such that a user may be able to look up and understand the meaning of any auditory cue.

It may be appreciated that FIG. 2-3 provides only an illustration of one implementation and does not imply any limitations with regard to how different embodiments may be implemented. Many modifications to the depicted environments may be made based on design and implementation requirements. For example, in at least one embodiment, the spatial weather map sonification program 110A, 110B may provide tactile information to a visually impaired user to help guide them to the location on a map and the location of the weather that surrounds them.

In another embodiment, the spatial weather map sonification program 110A, 110B may provide auditory information to users who are not visually impaired. For example, if a lifeguard is watching swimmers on the beach and the lifeguard has no access to a mobile device. Given the bright sunshine, the user must rely on auditory information. The lifeguard may interact with the spatial weather map sonification program 110A, 110B to determine the arrival of a weather system bringing rain and potentially hazardous lightning to the beach. The lifeguard may obtain information from the spatial weather map sonification program 110A, 110B that the weather is approaching from the north and will reach the user's location in 10 minutes. The lifeguard may safely warn swimmers to leave the water and take cover as the system approaches. In another example, a workplace management company or a building management company may monitor user behavior and use of a building and there could be a tornado approaching the building. Although site service typically requests that occupants move to the safest location in the building, this may not work for those who are visually impaired as it is hard for them to find a safe location. The spatial weather map sonification program 110A, 110B may provide sound localization not only to identify the path of the tornado but also may provide the companies with auditory information to direct the user to a safe place.

In yet another embodiment, the spatial weather map sonification program 110A, 110B may use non-weather data in data visualizations. An example of this may be the use of alerting, counts, inventory, statistics affiliated with specific geo-locations or time, and plotted in the context of the location or the time.

In yet another embodiment, the spatial weather map sonification program 110A, 110B may use data visualizations that are not maps such as time series charts. In another embodiment, the spatial weather map sonification program 110A, 110B may explore locations that are not a user's current location. For example, when a point of interest location is fixed, playback starts at this location and emanates outward in all directions and ending at the perimeter of the map. When the point of interest location remains fixed throughout the playback, and the playback follows a timeline of the past to the present or the present to the future. For example, similar to the weather in motion on a map, where the user's location is fixed and weather layer(s) animate, passing over the location. As the weather passes over a location, the user hears sound attributes mapped to the layer(s). When the default point of interest may be changed, the user may change their point of interest, such as the user's current location to a location of their asset.

Figure 4:
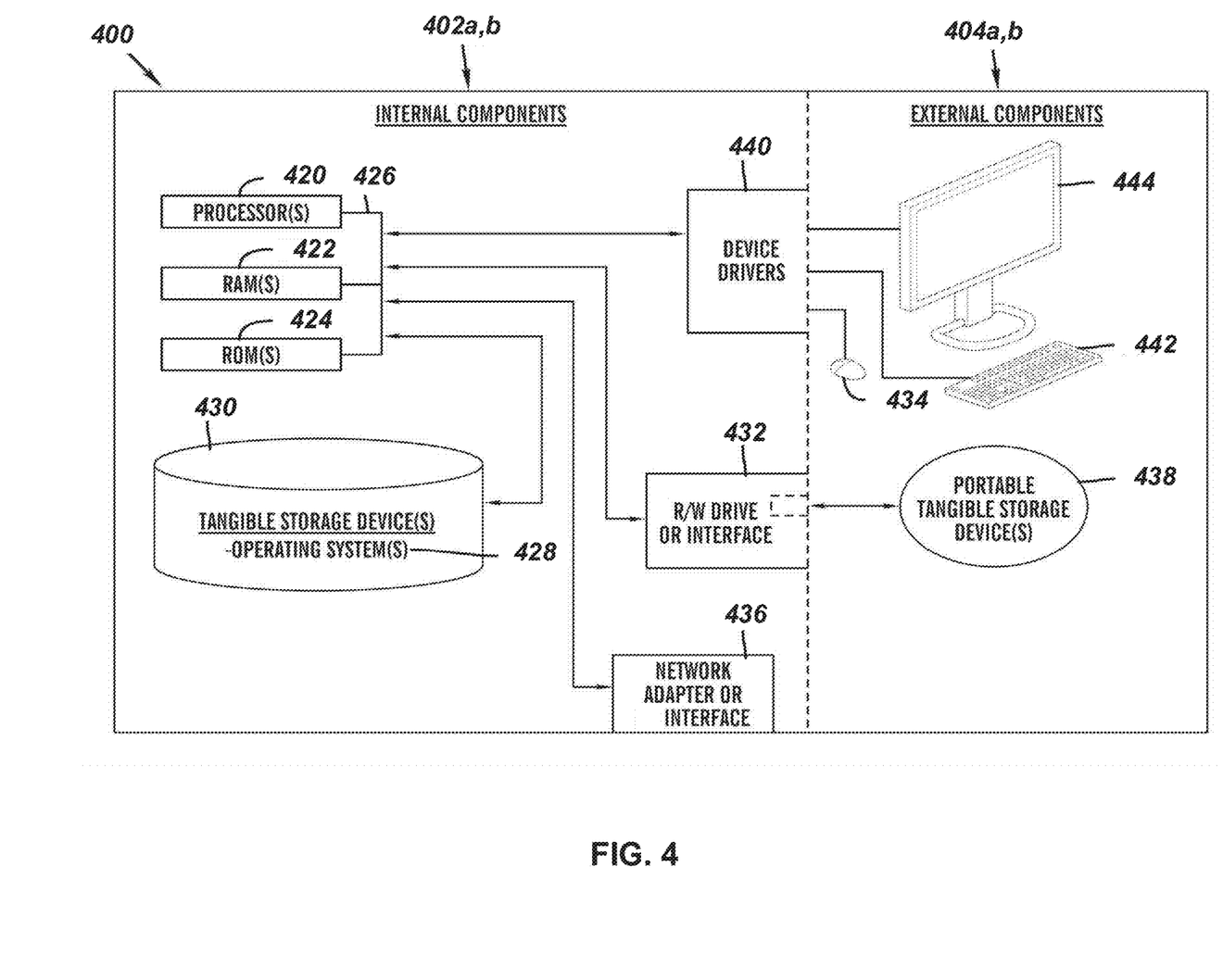
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 328 and one or more computer-readable tangible storage devices 430. The one or more operating systems 428, the software program 108 and the spatial weather map sonification program 110A in the client computing device 102 and the spatial weather map sonification program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the spatial weather map sonification program 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and t the spatial weather map sonification program 110A in the client computing device 102 and the spatial weather map sonification program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the spatial weather map sonification program 110A in the client computing device 102 and the spatial weather map sonification program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
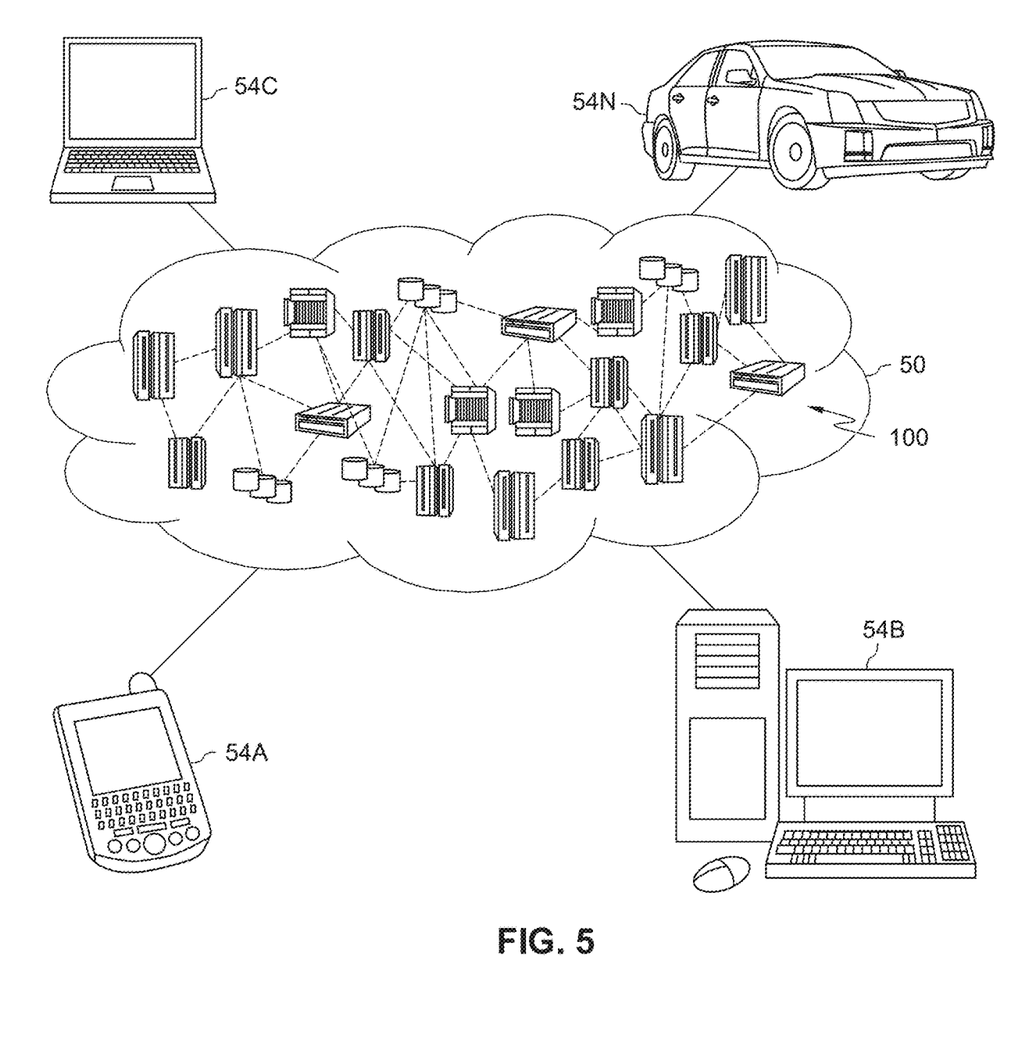
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
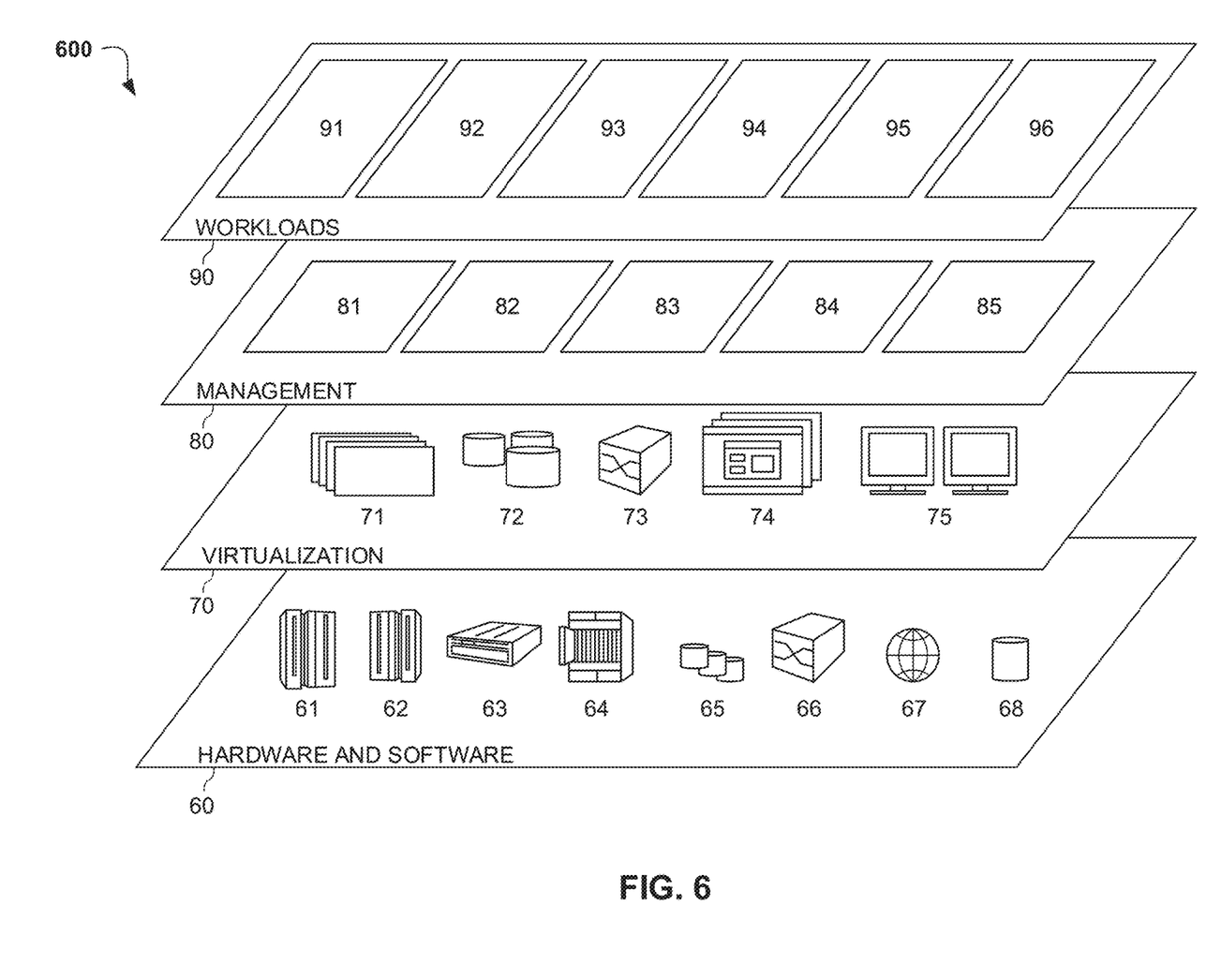
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and spatial weather map sonification 96. Spatial weather map sonification 96 may relate to providing additional means of communication of weather for visually impaired persons as well as persons in a situation where visual aids are not available, The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing weather information, the method comprising:
   receiving, via a computer and from a user, an indication of a subject of interest;
   determining, via a program of the computer, a geo-location of the subject of interest, the geo-location comprising a latitude and longitude of the subject of interest;
   determining, via the program of the computer, weather information representing a weather condition within a threshold radius distance from the geo-location, wherein the determining of the weather information comprises the program accessing a map hosted by the computer; and
   generating via the computer and playing, via an audio speaker connected to the computer, sounds corresponding to the weather information, the sounds including characteristics which allow the user to use sound localization on the sound to determine a relative position of the weather condition, represented by the weather information, with respect to the latitude and longitude of the geo-location.

2. The method of claim 1, wherein the generated sounds vary in pitch and tone in order to identify intensity of a feature of the weather information.

3. The method of claim 1, wherein the generated sounds vary in volume and frequency to describe distance and directional location of the weather information.

4. The method of claim 1, further comprising:
providing tactile information to the user to help guide the user to a first map position of the subject of interest on the map and to a second map position of the weather information on the map.

5. The method of claim 1, wherein the weather information is selected from a group consisting of current weather information, historical weather information, and forecast weather information.

6. The method of claim 1, wherein the weather information relates to a weather event approaching the subject of interest.

7. The method of claim 6, wherein the subject of interest is a current location of the user, and wherein the method further comprises monitoring behavior of the user as to the approaching weather event after the sounds for the weather information are generated.

8. The method of claim 1, wherein the generating the sounds further comprises generating auditory cues in combination to simultaneously represent an overlay of various weather conditions.

9. The method of claim 1, further comprising:
audibly playing words to communicate weather information with respect to the subject of interest.

10. The method of claim 1, further comprising:
prompting the user to apply a filter to settings for the generated sounds.

11. The method of claim 10, wherein the filter comprises selecting a weather parameter effect selected from a group consisting of adding a weather parameter and hiding a weather parameter.

12. The method of claim 1, further comprising:
prompting the user to customize at least one member selected from a group consisting of pitch, tone, loudness, and tempo per weather event for the weather information.

13. The method of claim 1, further comprising:
receiving input of a new location different from the geo-location of the subject of interest; and
generating second sounds corresponding to the weather information, the second sounds including characteristics to allow the user to use sound localization with respect to the user in to determine a relative position of the weather information with respect to the new location.

14. The method of claim 1, wherein the generating and the playing of the sounds corresponding to the weather information further comprises the program starting from the latitude and the longitude of the subject of interest and emanating outward in various directions and playing the sounds as the emanating encounters a respective weather condition.

15. The method of claim 1, wherein the sounds comprise multiple sounds and the method further comprises:
receiving a user selection of one of the multiple sounds, the user selection being provided via user actuation of an input device of the computer; and
playing, via the speaker connected to the computer, additional details about the weather information associated with the selected sound.

16. A computer system for providing weather information, the computer system comprising:
one or more processors, one or more computer-readable memories, one or more computer-readable tangible storage media, an audio speaker, and program instructions stored on at least one of the one or more tangible storage media for execution by at least one of the one or more processors via at least one of the one or more memories to cause the computer system to:
receive from a user an indication of a subject of interest;
determine a geo-location of the subject of interest, the geo-location comprising a latitude and longitude of the subject of interest;
determine weather information representing a weather condition within a threshold radius distance from the geo-location, wherein the determining of the weather information comprises accessing a map hosted by the computer system; and
generate and play, via the audio speaker, sounds corresponding to the weather information, the sounds including characteristics which allow the user to use sound localization to determine a relative position of the weather condition, represented by the weather information with respect to the latitude and longitude of the geo-location.

17. The computer system of claim 16, wherein the program instructions are further for execution to cause the computer system to prompt the user to customize at least one member selected from a group consisting of pitch, tone, loudness, and tempo per weather event for the weather information.

18. The computer system of claim 16, wherein the program instructions are further for execution to cause the computer system to:
receive input of a new location different from the geo-location of the subject of interest; and
generate second sounds corresponding to the weather information, the second sounds including characteristics to allow the user to use sound localization to determine a relative position of the weather information with respect to the new location.

19. The computer system of claim 16, wherein the generating and the playing of the sounds corresponding to the weather information further comprises the program starting from the latitude and the longitude of the subject of interest and emanating outward in various directions and playing the sounds as the emanating encounters a respective weather condition.

20. A computer program product for providing spatial weather map data to a visually impaired user, the computer program product comprising:
one or more computer-readable tangible storage media and program instructions stored on at least one of the one or more tangible storage media, the program instructions executable by a processor of a computer to cause the computer to:
receive from a user an indication of a subject of interest;
determine a geo-location of the subject of interest, the geo-location comprising a latitude and longitude of the subject of interest;
determine weather information representing a weather condition within a threshold radius distance from the geo-location, wherein the determining of the weather information comprises accessing a map hosted by the computer; and
generate, via an audio speaker connected to the computer, sounds corresponding to the weather information, the sounds including characteristics which allow the user to use sound localization to determine a relative position of the weather conditions represented by the weather information with respect to the latitude and longitude of the geo-location.

\* \* \* \* \*